(12) United States Patent
Ellis

(10) Patent No.: US 6,351,101 B1
(45) Date of Patent: Feb. 26, 2002

(54) CHARGE REFLECTOR CIRCUIT

(76) Inventor: Haynes Ellis, 14981 Oakwood La., Chino H, CA (US) 91709-2526

( * ) Notice: Subject to any disclaimer, the term of this patent is extended or adjusted under 35 U.S.C. 154(b) by 19 days.

(21) Appl. No.: 09/640,560

(22) Filed: Aug. 18, 2000

(51) Int. Cl.⁷ .............................. H02J 7/00; G05F 1/613
(52) U.S. Cl. ........................................ 320/137; 323/224
(58) Field of Search .......................... 320/137; 323/224, 323/220, 223, 226, 266, 270; 607/33, 61; 307/45, 49, 61, 77

(56) References Cited

U.S. PATENT DOCUMENTS

| | | | |
|---|---|---|---|
| 4,130,780 A | 12/1978 | Ban et al. ................. | 315/241 P |
| 4,237,897 A | 12/1980 | Beane et al. .................. | 607/34 |
| 4,697,221 A | 9/1987 | Pasquarella .................. | 361/156 |
| 5,101,335 A | 3/1992 | Ludden et al. ............ | 363/21.17 |
| 5,387,820 A | 2/1995 | Imagawa ...................... | 307/31 |
| 5,528,087 A | 6/1996 | Sibata et al. .................. | 307/66 |
| 5,686,816 A | 11/1997 | Hayashi et al. .............. | 320/106 |
| 5,781,804 A | 6/1998 | Constable ...................... | 396/6 |
| 5,835,366 A | 11/1998 | Pleso et al. .................... | 363/59 |
| 5,991,168 A | 11/1999 | Farrington et al. ........... | 363/16 |
| 5,998,886 A | 12/1999 | Hoshino et al. .............. | 307/66 |

*Primary Examiner*—Peter S. Wong
*Assistant Examiner*—Pia Tibbits
(74) *Attorney, Agent, or Firm*—Brande and McCleary; Lewis M. Brande; Thomas A. McCleary

(57) ABSTRACT

This invention uses a group of components set in parallel transmission lines and terminated with hi-speed switching circuits. The charging and discharging of the circuits are controlled by the opening and closing of the switching circuits causing a percentage of the unused energy to be reflected back to the charge source, returning a portion of the unused charge to be used at a later date when the source is needed to drive a component.

7 Claims, 2 Drawing Sheets

CHARGE REFLECTOR CIRCUIT

BACKGROUND OF THE INVENTION

1. Field of the Invention

This is a device that utilizes the physics of conservation of momentum to extract electrical energy from a circuit. More particularly, the present invention relates to specialized circuitry that conserves the net momentum of the free mobile electrons in a circuit to reflect the charge imputed to the circuit.

2. Present State of the Art

The present electrical circuits are designed and engineered around the principles of continuity of current and conservation of energy.

This invention is most applicable in the area of battery powered supplies prevalent and used in many different applications and in connection with a myriad of devices. Typically, such power supplies have a finite amount of power associated therewith due to their portable nature. Common examples include the types and varieties of batteries found in all sorts of consumer electronics, notebook computers, and event automobiles to name just a few applications.

A number of trade offs are associated with battery power and either forms of portable power supplies. An important trade-off to consider is the energy capacity of a power supply versus its size and weight. Usually, a higher capacity power supply will be larger and heavier than a lower capacity power supply. The added bulk and weight can be a significant disadvantage in the portable applications where such power supplies find their beneficial use.

A primary example is in the area of notebook computers. Notebook computers commonly derive their power from a rechargeable battery, such as a nickel-cadmium, nickel-hydride, or similar battery, when a source of line power is not available. Such notebook computers are carried by businessmen between office and home or between office and client sites, and can be used during travel on a commercial aircraft. With a portable computer as is generally true with all portable battery operated electronic devices, the consumer desires the longest possible battery life (operating times of a battery) in order to maximize the length of time the computer or other devices can be used between battery recharges. In other applications, wherein non-rechargeable batteries are used to provide power, the longest possible battery life is also important so as to get longer services from a battery before it has to be replaced. Consequently, much research and effort has been expended to maximize the effective service life or operating time of batteries. Heretofore, such efforts have been directed generally in two principles areas. First, major advances have been achieved by attempting to optimize the chemical compositions of the batteries themselves, thereby developing batteries with a greater energy density or storage capacity and, thus, a longer effective battery life.

The resulting developments and technology have continually increased the energy storage capacity of batteries so that more energy can be stored within a particular size and weight battery. However, all of these efforts are directed at developing a better battery design and do not provide a circuit that utilizes, more efficiently, energy available from a battery circuit thereby increasing the operating time of a given battery.

A second approach to increasing battery life has been to reduce the overall power consumption of a particular device so as to minimize the power demands placed on a battery. For example, notebook computers commonly include power management circuitry that turns off computer displays, hard drive motors, etc., when the computer has been inactive for a pre-determined period of time. Circuitry to reduce power to the microprocessor and other circuitry when inactive for a certain amount of time, display blanking circuitry for inactivity, development of semiconductor devices that require very little power to operate effectively, etc. However, this type of approach also introduces significant inconveniences to the user. Furthermore, many of the particular battery operated devices are not readily transferred from one device to the next.

Description of the Prior Art

Numerous electronic circuits have been developed to manage, conserve and prolong the energy in a given battery.

U.S. Pat. No. 5,998,886 discloses a Power Supply Apparatus Having a Function of Compensating for Changes in Voltage. This invention provides A.C. power from an A.C. generating circuit when a voltage-variation detecting circuit "detects" anomalies in the incoming voltage source. The purpose of this invention is to provide a constant A.C. voltage an output terminal whenever the input voltage varies, which will cause difficulties when the A.C. voltage anomalies, i.e. variations in voltage. It operates by charging a capacitor, and when an anomaly is detected by the voltage-variation detecting circuit, a timer circuit operates a switch causing the capacitor to discharge into an inverter which inverts the D.C. to A.C. and the output is coupled to the anomalous A.C. voltage from the initial source, stabilizing the output voltage.

U.S. Pat. No. 5,686,816 to Hayashi et al., describes a Charging Control Circuit. The basic premise of this patent is the circuitry needed to charge a portable telephone battery, of any type. The built in circuitry can detect which style of battery is inserted into the portable telephone. The charging circuits are also able to discern when the batteries have been fully charged. This patent is differentiated from the present invention in that the disclosed patent does not maximize the battery life by use of existing "reflected" charge, but only involves the charging of the batteries of the portable telephone.

U.S. Pat. No. 5,528,087 to Sibata et. al., discloses a power supply for hand-held electronic devices with volatile memory, which combines a battery, diode, and charging capacitor. While the device is on, the battery charges the capacitor. When the device is turned off, the supply voltage stored on the capacitor is compared with a reference voltage and the battery is automatically coupled to the boosting circuit for a pre-determined time whenever the supply voltage stored in the capacitor drops below the reference voltage.

This invention as disclosed does not extend battery life but in fact enhances the life of volatile RAM by using the charge stored in the circuit and intermittently turning on when the power source to the memory is less than the reference voltage.

U.S. Pat. No. 5,101,335 to Ludden et. al. Discloses a DC-to-DC converter which is operated using coupled inductor current sensing and predetermined on time so that optimum performance of a low level voltage D.C. power source and the converter is achieved. The circuit includes a switching means for selectively interrupting the current flow through the primary winding of the inductor.

The circuit also includes means for sensing the current in the secondary winding of the inductor and reactivating the switching means whenever the current in the secondary winding falls below a predetermined level.

The purpose of this invention as disclosed is to charge a capacitor used in an electronic photo-flash. The disclosed circuit provides optimum performance of the low voltage DC power source.

U.S. Pat. No. 4,237,897 to Beane et. al., discloses a battery life extender circuit for use in an implantable tissue simulator, which supplies a substantially constant voltage to volatile memory for a longer period of time by gradually reducing the amplitude of output pulses from the output circuit and directing current to the memory, thus keeping the volatile memory "alive" and not severely affecting the primary output pulses.

U.S. Pat. No. 4,130,780 to Ban et. al., discloses selective connection and disconnection of a battery from the load through the use of an electromechanical switching means which disconnects the battery from the charging circuit after a predetermined time interval.

The purpose of this invention as disclosed is to have a feature which will avoid wasteful consumption of stored energy, generally when a user neglects to discharge an electronic photoflash.

U.S. Pat. No. 5,387,820 to Imagawa, discloses a power management circuit which compares a battery voltage with a reference voltage and automatically switches the power source to a battery or a step up circuit output when the battery voltage is higher or lower, respectively, then the reference voltage.

What is needed, and provided by this invention, is a relatively simple and inexpensive circuit that significantly improves the utilization of any battery as it applies to a given circuit load, regardless of type or chemistry of the battery. This circuit is readily adaptable to provide the voltages and power consumption requirements of a wide variety of applications.

SUMMARY AND OBJECTS OF THE INVENTION

It is a primary object of the present invention to provide a more efficient use of electrical charge to deliver electrical energy to a load.

It is a further object of the invention to provide circuitry that extends the operating life of any battery regardless of the type of chemistry of the battery.

Additional objects and advantages of the invention will be set forth in the description, which follows, or may be learned by the practices of the invention.

The advantages of the invention may be realized and obtained by means of the combination of electrical components pointed out in the appended claims to achieve the forgoing object, and in accordance with the invention as embodied and broadly described herein. Apparatus and methods for extracting more energy from an electrical circuit are provided. More specifically, the invention combines circuit components with high speed semiconductor switching means to selectively open and close circuit terminations at precise intervals so as to transfer charge between transmission lines.

In accordance with the present invention, the switching of charge flow facilitates the inductive transfer of energy to a load. The momentum of charge flow between transmission lines is maintained by high speed switching at near zero loss in momentum, with an appropriate transfer of energy to a load.

Charge is initially placed into a transmission line "$Z_0$" during the closing of switch a "$S_1$". Upon the opening of the switch "$S_1$" a current pulse is reflected back toward the voltage source and the simultaneous closing of a switch "$S_2$". This sets up a current pulse in the transmission line "$Z_1$," with the mutual coupling that exists between lines "$Z_0$" and "$Z_1$" the current are waves added in a manner that increases to the charge delivered to the voltage source. The present invention functions as a pulsating charge reflector. These and other features of the present invention will become more fully apparent from the following description and appended claims, as may be learned by the practice of the art set forth hereinafter.

The above and other objects, features and advantages of the present invention will become apparent from the following description and the appended claims, taken in conjunction with the accompanying drawings in which preferred embodiments of the present invention are shown by way of illustrative example. The present invention is not necessarily limited to the embodiments.

BRIEF DESCRIPTION OF THE DRAWINGS

The invention is better understood by studying the cited embodiments illustrated in the appended drawings. These drawings depict only typical embodiments of the invention and are not therefore to be considered to be limiting of its scope, the invention will be described and explained with additional specificity and detail through the use of the accompanying drawings in which.

DESCRIPTION OF THE PREFERRED EMBODIMENT

Figure 1:
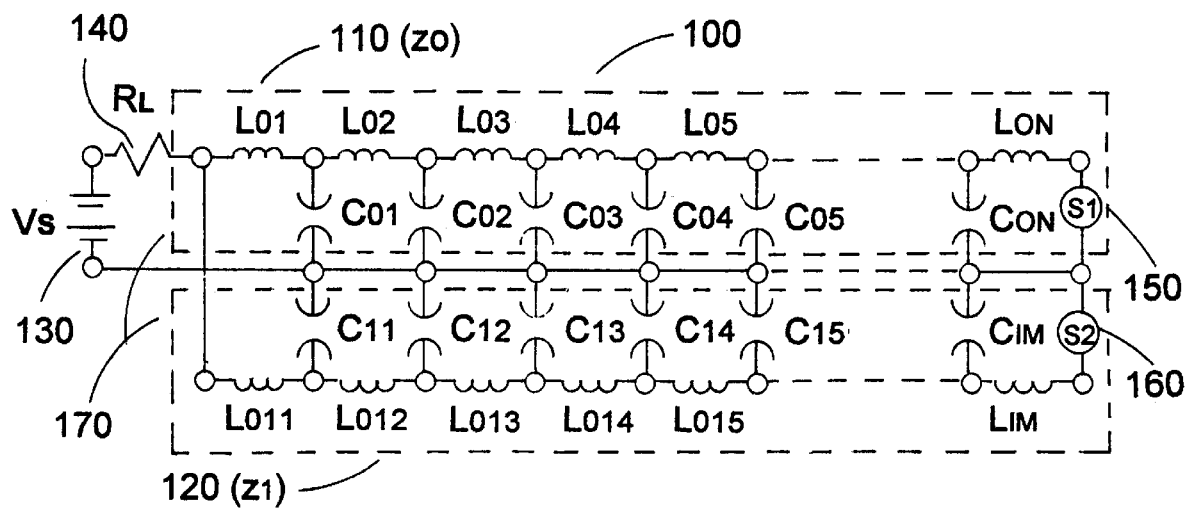
FIG. 1 is a simplified circuit diagram schematically indicating the functional embodiment of the charge reflector according to the present invention.
Figure 2:
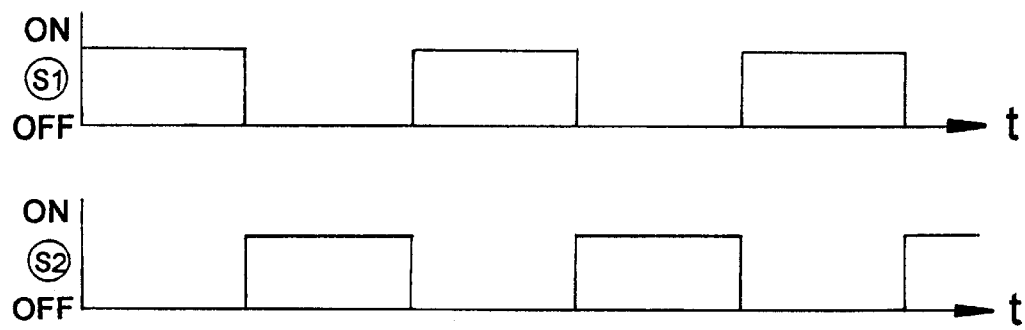
FIG. 2 is a diagram of the time line of the signals that drive the respectful switches $S_1$, and $S_2$ shown in FIG. 1.

The charge reflector circuit (100) as depicted in FIG. 1 consists generally of two transmission lines $Z_0$ (110), and $Z_1$ (120), a battery (voltage source) $V_S$ (130), load $R_L$ (140), a switching logic circuit containing switches $S_1$ (150), and $S_2$ (160), as graphically depicted in FIG. 2. The voltage source (130) provides charge to the transmission line network (170), which contains mutually coupled transmission lines $Z_0$ (110), and $Z_1$ (120) of the present invention.

The present invention is adaptable to use with various types of conventional battery or electrical power supplies currently available and, will significantly extend the effective life or operating time of the power supply. Herein, the "operating time", as it relates to a battery shall mean the amount of time that a given battery provides power to a given load between the time the battery is in a fully charged condition and the time the battery is completely discharged. The mutually coupled transmission lines $Z_0$ (110), and $Z_1$ (120), are represented by a finite network of lumped components, herein defined in the present invention as inductors $L_{01}$ through $L_{0N}$, and $L_{11}$ through $L_{0N}$ coupled with capacitors $C_{01}$ through $C_{0N}$ and $C_{11}$ through $C_{1N}$, shown in FIG. 1, which coupled together function to reflect the input charge, with respect to the charge returned to the source. The charge is reflected by switching the terminating impedance of the transmission lines from open-circuit to short-circuit conditions. The switching is accomplished through high-speed devices attached to the mutually coupled transmission lines $Z_0$ (110), and $Z_1$ (120). The high-speed devices can be constructed using standard semi-conductors such as IGBT's, MOSFET's or SCR's to terminate the lines at switches $S_1$ (150), and $S_2$ (160). The more rugged component SCR can only be used on line $Z_1$ (110).

Inherent in all switching are switching times, including rise time, fall-time and delay time. The faster that such switching times can be made, the more efficient the operation of the present invention. Switches $S_1$ (150) and $S_2$ (160) are presented more conveniently in the forms shown in FIG. 1 rather than as discreet electronic circuit components it will be understood by those skilled in the art that the particular construction of the switches is not particularly significant as long as they operate and function as described herein. The general operation of the present invention will now be described with regard to FIG. 1. Transmission line $Z_0$ (110) is initially charged to a predetermined voltage $V_S$ (130). The circuit is placed into operation by opening and closing switches $S_1$ (150) and $S_2$ (160) at discreet time intervals throughout operation of the circuit. The magnitude of the current pulse created by the closing of $S_1$ (150), is related to the duration of $t_0$. Upon the opening of switch $S_1$, (150), this current pulse is reflected back to the source. Due to the mutual coupling between transmission lines $Z_0$, (110) and $Z_1$ (120), the direction of the charge delivered to the source and load $R_L$ (140) is increased.

An initially charged, finite low-loss transmission line will setup a traveling wave when changed from an open-ending termination to a shorted one. Reference is now made to FIG. 2, a graphical illustration of the opening and closing of switches $S_1$ (150) and $S_2$ (160) as a function of time.

Figure 3:
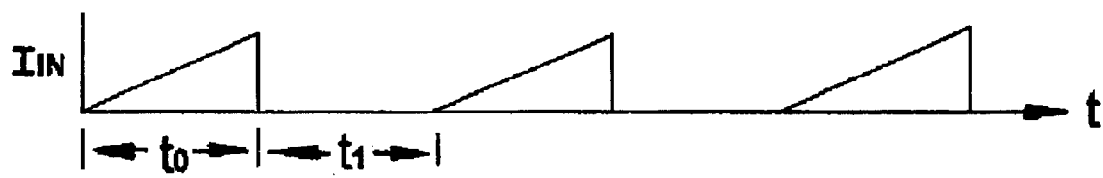
FIG. 3 is a diagram of the waveshape and timing of the input charge signal to the network.
Figure 4:
FIG. 4 is a diagram of the waveshape and timing of the output charge signal to the source.

FIG. 3 depicts the charge/current input time line of the circuit. FIG. 4 is a depiction of the return charge/current to the source of the present invention.

Figure 5:
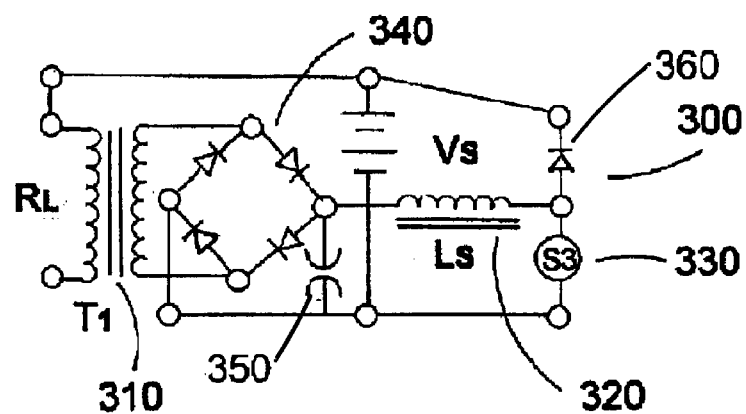
FIG. 5 is a simplified modified full-bridged inverter circuit

The output load $R_L$ (140) can be replicated by the inverter circuit (300) recited in FIG. 5. The inverter of FIG. 5 is comprised of an input/output transformer $T_1$ (310), full wave rectifier bridge (340) which also functions as a free wheeling diode array, and energy storing inductor $L_S$ (320). The inductor, $L_S$ (320), is terminated by a switching means $S_3$ (330), that is activated synchronous with switch $S_1$, (150), which enables better rectification efficiency of the bridge circuitry. When $S_3$ (330) is closed, energy is stored in inductor $L_S$ (320). The opening of $S_3$ (330) transfers charge to source $V_S$ (130).

The signal applied to terminals a and b of $R_L$ (140) by the Charge Reflector Circuit (300), is a bipolar square wave. This signal is rectified by a bridge diode array (340) and it's energy is stored in capacitor Cs (350). The closing of switch $S_3$ (330) transfers the energy to inductor Ls (320), where the values of inductor Ls (320) and capacitor Cs (350) are chosen such that the peak current flow in inductor Ls (320) is within the period when switch $S_3$ (330) is closed. The opening of switch $S_3$ (330) then transfers the energy via a diode (360) which is operating in series with the bridge diode array (340). The bridge diode array (340) is functioning as a free wheeling diode assembly to voltage supply $V_s$ (130).

With the time-constant of discharge for inductor $L_s$ (320) being much shorter than the period of switch $S_3$ (330), when switch $S_3$ (330) is open, it provides adequate time for the rectifier circuit (300) to recover the energy, store the energy in capacitor $C_S$ (350) and to repeat the process.

Those skilled in the art of analysis of the transmission line equation shown below will appreciate the embodiments and scope of the invention.

$$\frac{\partial^2 i}{\partial x^2} - \gamma^2 \frac{\partial^2 i}{\partial t^2} = 0 \quad \text{Where} \quad \gamma \triangleq \alpha + j\beta \text{ Is the program constant}$$

s=Laplase Transform Function
$\beta$=Phase Constant
$\alpha$=Attenuation Constant
$\gamma$=propagation constant
erfc(x)=Complementary Error Function $$D \triangleq \frac{t_0}{T_0} - \text{Duration factor} \quad \alpha \frac{z_0}{z_1} \infty \frac{I_0(x, t)}{I_1(x, t)}$$

$$q_0 \triangleq \int_0^{t_0} I_0 dt \qquad Q_0 = \int_{t_0}^{T_0} I_1 dt$$

$T_0$=period $$I(x, t) = \text{erfc}\left[\frac{x}{2}\sqrt{\frac{z_0 y_0}{t}}\right]$$

$=Z_0=r_0+sl_0$; $y=G_0+sC_0$
$Z_0$=Characteristic impedance

It can be shown that the response of a low-loss finite transmission line to a step-voltage simulus is a current-wave $$I(x, t) = \text{erfc}\left[\frac{x}{2}\sqrt{\frac{3y}{t}}\right] \text{ and } \frac{I_0(x, t)}{I_1(x, t)} < \frac{z_0}{z_1}$$

where $$\triangleq \frac{z_0}{z_1}$$

is proportional to the ratio of the output charge "$Q_0$" and input "$q_0$" charge.
Where:

$$q_0 = \text{input charge} \triangleq \int_0^{t_0} I_0 dt$$

$$Q_0 = \text{output charge} \triangleq \int_0^{t_0} I_1 dt$$

The scope of the invention includes all equivalent circuits and implementations whether implemented with distributed or lumped circuit elements.

What is claimed is:

1. A charge reflector circuit for extending the operating life of a voltage source with respect to a load, the circuit comprising:
   a mutual coupled transmission lines network, said transmission lines network having a voltage source means, a load means and a switching means, wherein the mutual coupled transmission lines network is terminated in said switching means for alternately opening and closing said circuit.

2. A charge reflector circuit as claimed in claim 1 wherein said switching means comprises:
   a switching component having a plurality of solid-state devices, said plurality of solid state-devices being connected to a controller means, said controller means controlling and co-ordinating the opening and closing of said switching component.

3. A charge reflector circuit as claimed in claim 2, wherein:

a signal is applied to said load means from said charge reflector circuit, said charge reflector circuit having a transformer, an inductor, a switch, a bridge diode array a capacitor and a diode, said signal rectified by said bridge diode array and said signal from said bridge diode array stored in said capacitor, said switch when closed transferring energy from said capacitor to said inductor and said switch when opened transferring said energy via said diode, said diode in series with said bridge diode array, wherein a time constant for discharge of said inductor is shorter than a period for said switch so that when said switch is open, said charge reflector circuit has adequate time to recover said energy stored in said capacitor, said mutual coupled transmission lines network is charged by said voltage source means for a predetermined portion of the network operating cycle (period), said switching means is opened and said transmission lines network reflects the current pulse during the remainder of the operating cycle (period).

4. A charge reflector circuit as claimed in claim 2, wherein:

said switching means operates in conjunction with an energy storing inductor means for the purpose of converting alternating current into direct current.

5. A method for extending the operating time of a voltage source as applied to a load, the method comprising:

forming a network circuit using a charge reflector means consisting of a voltage/load means and a set of solid-state switching means;

charging a first transmission line to a predetermined voltage;

closing a first switching means for a time $t_0$;

opening a second switching means; and reflecting a charge back to said voltage/load means through a second transmission line.

6. A method for extending the operating time of a voltage source as applied to a load as recited in claim 5, comprising:

charging said first transmission line for a predetermined portion of each period and receiving a charge to said voltage/load means through said second transmission line for the remainder of each period.

7. The method as claimed in claim 6, comprising:

charging said transmission lines network for a predetermined portion of each period, the predetermined charging portion "$t_0$" of the period "$T_0$" is less than one half of the operating period, or "$T_0/2$".

* * * * *